(12) United States Patent
Daniel

(10) Patent No.: US 8,875,170 B1
(45) Date of Patent: Oct. 28, 2014

(54) CONTENT ROAMING SYSTEM AND METHOD

(76) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 13/401,757

(22) Filed: Feb. 21, 2012

Related U.S. Application Data

(60) Provisional application No. 61/444,162, filed on Feb. 18, 2011.

(51) Int. Cl.
*H04N 7/16* (2011.01)
*H04N 21/45* (2011.01)
*H04N 21/454* (2011.01)

(52) U.S. Cl.
CPC .......... *H04N 21/4524* (2013.01); *H04N 21/454* (2013.01)
USPC .............................................. 725/25; 725/35

(58) Field of Classification Search
CPC ............ H04N 21/222; H04N 21/4126; H04N 21/41407; H04N 21/40
USPC .......... 705/51, 52, 53, 59; 725/25–31, 62, 74, 725/78–82, 85
See application file for complete search history.

(56) References Cited

U.S. PATENT DOCUMENTS

| | | | |
|---|---|---|---|
| 7,103,358 B2 | 9/2006 | Rodriguez et al. | |
| 7,155,415 B2 | 12/2006 | Russell et al. | |
| 7,437,769 B2 * | 10/2008 | Meyerson | 726/28 |
| 7,813,822 B1 | 10/2010 | Hoffberg | |
| 8,131,993 B2 * | 3/2012 | Kline et al. | 713/150 |
| 8,224,751 B2 * | 7/2012 | Farrugia et al. | 705/59 |
| 8,326,774 B2 * | 12/2012 | Candelore | 380/227 |
| 2002/0069176 A1 * | 6/2002 | Newman | 705/53 |
| 2004/0010417 A1 * | 1/2004 | Peled | 705/1 |
| 2004/0055018 A1 * | 3/2004 | Stone | 725/113 |
| 2004/0267552 A1 * | 12/2004 | Gilliam et al. | 705/1 |
| 2006/0190290 A1 * | 8/2006 | Gomez | 705/1 |
| 2007/0271106 A1 * | 11/2007 | Lee et al. | 705/1 |
| 2008/0097921 A1 | 4/2008 | Kim et al. | |
| 2008/0209491 A1 * | 8/2008 | Hasek | 725/114 |
| 2010/0005483 A1 * | 1/2010 | Rao | 725/25 |
| 2010/0064332 A1 * | 3/2010 | Krikorian et al. | 725/110 |
| 2010/0135279 A1 * | 6/2010 | Petersson et al. | 370/352 |
| 2011/0015968 A1 | 1/2011 | Carlson | |
| 2011/0016484 A1 * | 1/2011 | Choi | 725/25 |
| 2011/0055859 A1 * | 3/2011 | Dasher et al. | 725/1 |
| 2011/0055862 A1 * | 3/2011 | Harp et al. | 725/25 |

OTHER PUBLICATIONS

Wikipedia, Cable Theft, Wikipedia, the free encyclopedia, pp. 1/2, http://en.wikipedia.org/wiki/Cable_theft, retrieved May 15, 2013.
International Search Report, PCT/US2012/029981, 3 pages, mailed Dec. 28, 2012, Korean Intellectual Property Office, Republic of Korea Non-Final Office Action mailed Jul. 31, 2013, U.S. Appl. No. 13/080,660, filed Apr. 6, 2011.

* cited by examiner

*Primary Examiner* — Pankaj Kumar
*Assistant Examiner* — Timothy Newlin
(74) *Attorney, Agent, or Firm* — Isaac Daniel Group, Inc.

(57) ABSTRACT

A system for streaming media content to a remote media streaming device, wherein the system is operative to handle remote requests for the media content, and broker the authorization and broadcasting rights between a primary content provider and a secondary content provider, wherein the secondary content provider holds the rights to broadcast the requested content to the remote media streaming device.

25 Claims, 7 Drawing Sheets

CONTENT ROAMING SYSTEM AND METHOD

PRIORITY CLAIM

The present application is a U.S. non-provisional utility patent application based on U.S. provisional patent application Ser. No. 61/444,162, titled "Portable Content System and Method," filed on Feb. 18, 2011, by Isaac S. Daniel, which is hereby incorporated by reference as if fully stated herein.

FIELD

The present disclosure relates generally to electronic systems, apparatuses, and methods, and more particularly, to systems, methods, and various other disclosures related to television devices, such as signal converters, cable boxes, and the like.

BACKGROUND

Many content service providers, such as cable and television companies, provide their customers with devices that are operative to receive content service. One such example is a type of set top box commonly referred to as a "cable box" (or satellite box). Cable boxes are devices that receive a signal, usually a television signal, from television service provider. Cable boxes have traditionally served the purpose of converting the digital cable signal into an analog signal for televisions to display.

Since most modern televisions include digital signal converters, or are capable of displaying video directly from a digital signal, modern cable boxes perform many other functions such as providing video on demand, high definition channels, pay per view content, descrambling, and digital video recording.

Traditional cable boxes have been passive, meaning that they only receive information such as by tuning to a certain television channel. Modern cable boxes provide for two-way communication between the cable box and the service provider, which allows for more interactive services like video on demand to be provided. Modern cable boxes are also addressable, meaning that the service provider can independently identify one box from another.

Up until now, the use of cable boxes has been limited to single, fixed locations, such as a customer's home. In fact, many service contracts prevent customers from moving their cable boxes to a different address. Thus, if a customer would like to watch the same programming at home while traveling, they are unable to do so in a legitimate way.

There do exist, however, questionable, and in some territories illegal, ways of watching content received at home remotely. These products and services are called "place-shifting" products and services, and one such popular product is called Slingbox®, produced by Sling Media®. Place-shifting devices allow consumers to remotely view the content they receive at home by taking an analog audio/video signal, usually received from the cable box, and then broadcasting it to local viewing devices via a local network, or to remote viewing devices via the internet. The legality and legitimacy of place-shifting has been questioned and in some territories has been confirmed illegal, since place-shifting may violate copyright laws, since some content service providers may not have distribution rights in the area where the remote viewing is taking place. Additionally, there is no way for the content owner or the content service provider to know when its subscribers or users are place-shifting, so they are unable to charge fees for said place-shifting or to know whether distribution rights are being violate.

SUMMARY

The various embodiments of systems and methods described herein result from the realization that remote viewing of home content ("roaming") may be carried out legitimately and legally by providing a system and method for broadcasting home content to remote viewing devices via a content access management system that monitors the remote content requests, restricts said content access, is able to manage the distribution and digital rights associated with the content being remotely viewed, and manage or intercede the billing arrangements and roaming fees associated with the remote viewings.

Accordingly, the various embodiments and disclosures described herein solve the limitations of the prior art in a new and novel manner.

DETAILED DESCRIPTION OF PREFERRED EMBODIMENTS

System Level Overview

Figure 1A:
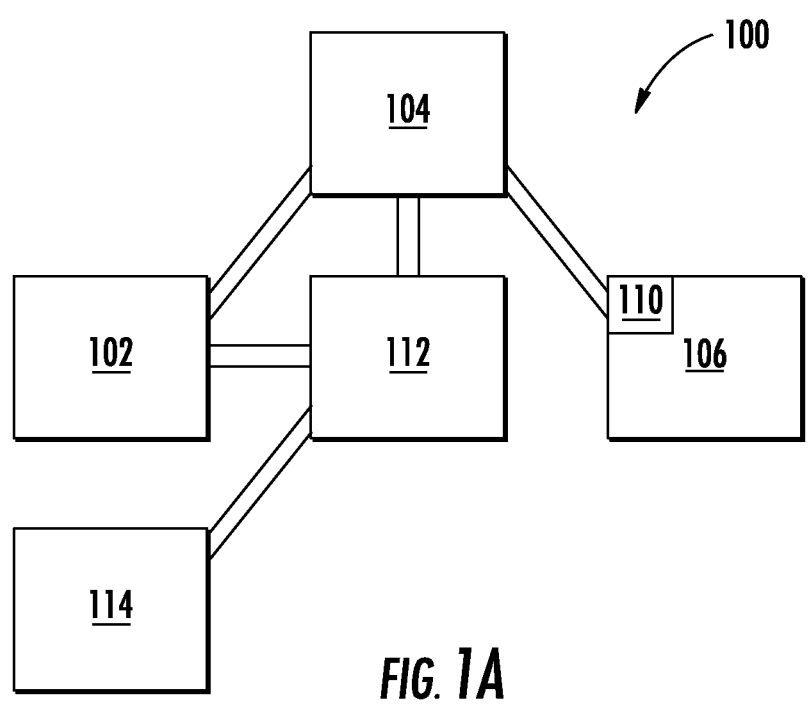
FIGS. 1A-1C shows a system for broadcasting content to remote viewing devices in accordance with various embodiments.

FIG. 1A shows an embodiment of a system for content roaming 100, wherein system 100 comprises a primary content provider module 102, a user relay module 104 that is operative to receive content from primary content provider module 102 and transmit the content to a remote viewing module 106, wherein remote viewing module 106 comprises a conditional access or digital rights management client 110, and a content access management module 112, which is operative to communicate with primary content provider module 102, user relay module 104, remote viewing module 106, and a secondary content provider module 114, receive requests for transmission of the content from primary content provider module 102 or secondary content provider module 114 to user relay module 104 or remote viewing module 106, wherein the requests originate from remote viewing module 106 or user relay module 104, broker the payment of a fee between primary content provider module 102 or remote viewing module 106, and secondary content provider module 114 when primary content provider module 102 does not have the right to transmit the content to remote viewing module 106, and authorize transmission of the content to remote viewing module 106 if authorization is obtained from primary content provider module 102 or secondary content provider module 114.

The system for content roam may allow content service subscribers (e.g. cable/satellite television subscribers) to legitimately access their content remotely (i.e. "roaming"), and allows content service providers (e.g. satellite/cable companies) or related third parties (e.g. foreign content providers, content providers, studios, etc.) to collect fees for the roaming/remote viewing service, based on who has the rights to distribute the content to the service subscribers while the subscribers are viewing the content remotely.

The terms "communicate," "communication," "connect," and "connection," as used herein, may refer to electronic communication or connections, such as wireless or wired electronic communication or connections.

Accordingly, primary content provider module 102 may be a domestic video content provider, such as, but not limited to, a cable television provider, a satellite television provider, a video on demand provider, a content distributor, a content producer, a content distribution network ("CDN"), a content rental provider, a streaming content provider, or a content studio. The term "domestic," as used herein, may refer to a customer's domestic, domiciliary, or home content provider. Often times, customers have a content provider that supplies content to their homes via content distribution networks, such as cable, satellite, video-on-demand, and streaming content networks. In these cases, the customers' domestic content providers would be their home content providers. Secondary content provider module 114 may comprise a foreign or third party content provider, such as cable or satellite television content provider, a video on demand provider, a content distributor, a content distribution network, a content producer, a content studio, a content rental provider, a streaming content provider, and the like. The terms "foreign" or "third party" may refer to content provider to which a customer is not subscribed to, such as a content provider in a foreign territory.

The term "module" as used herein, may refer to a hardware component, such as computer or networking hardware, which may comprise servers, computers, cabling, routers, display devices, and the like. Alternatively, the term "module" may refer to a software component, such as content distribution software applications, television programming applications, video playback applications, video or audio encoding or decoding applications, digital rights and/or conditional access rights management applications, clients, or servers, server operating systems, and the like. In some embodiments, the term "module" may be used to refer an application or system that combines both hardware and software components.

Figure 1B:
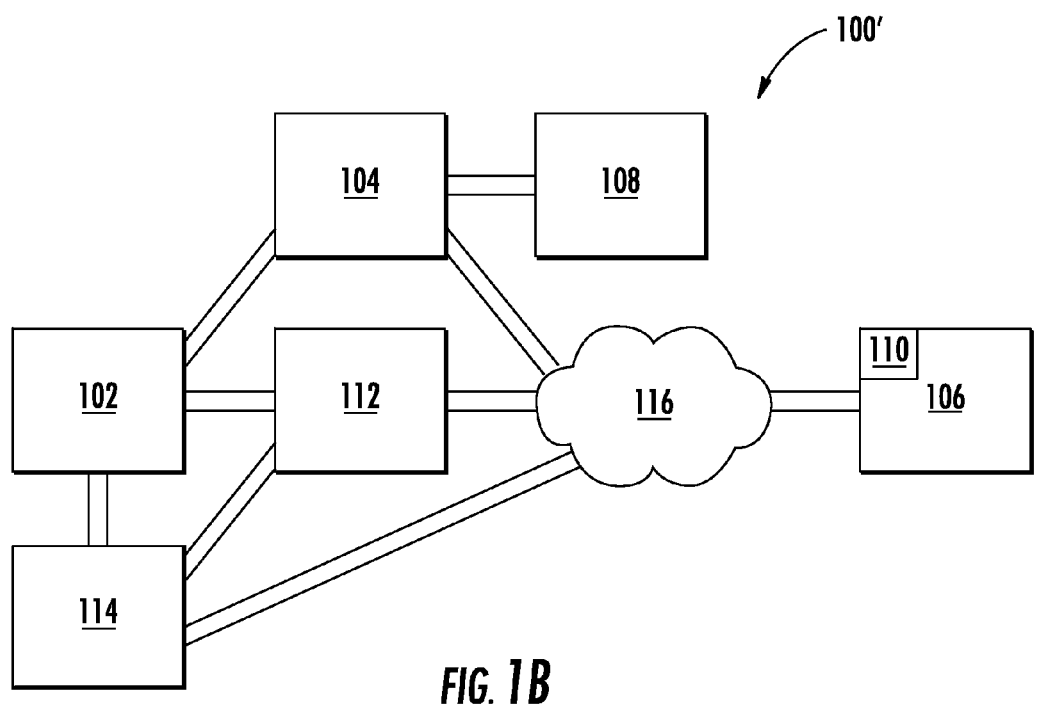
Figure 1C:
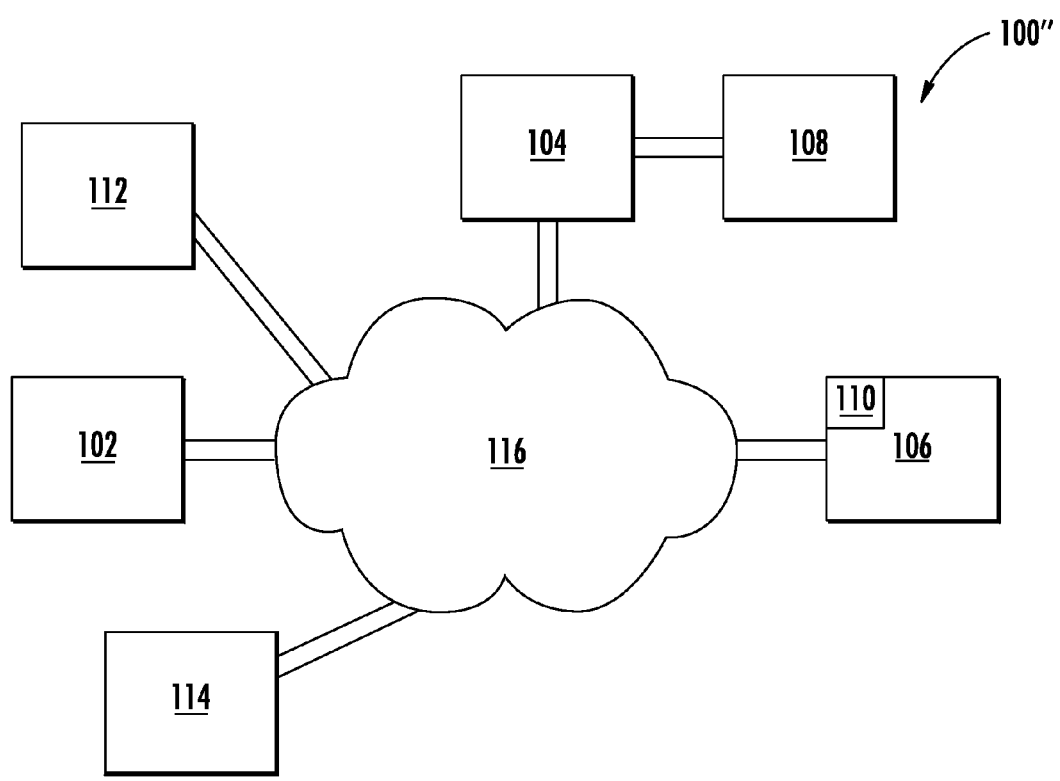

In some embodiments user relay module 104 comprises a streaming media device, wherein the streaming media device may be operative to receive content from primary content provider module 102, decode the content if necessary, and either pass it through to a local display device 108 (as shown in FIGS. 1B and 1C), or transmit it to remote viewing module 106. In some embodiments, user relay module 104 may be operative to receive content from primary content provider module 102 via an intermediary content decoding module, which may be connected to user relay module 104, and which may be operative to receive content from primary content provider module 102, decode it if necessary, and pass it on to user relay module 104. The intermediary content decoding module may comprise a cable box, satellite television box, or internet protocol television ("IPTV") box. The streaming media device may be equipped with inputs and outputs, such as RCA input/outputs, co-axial cable input/outputs, DisplayPort ("DP") input/outputs, Digital Visual Interface ("DVI") input/outputs, High Definition Multimedia Interface ("HDMI®") input/outputs, and the like. Accordingly, the streaming media device may be equipped with High-bandwidth Digital Content Protection ("HDCP") or similar technology to enable it to decode, decrypt, copy, transmit, or play HDCP protected content, or content protected by similar digital rights or conditional rights access protections. In a further embodiment, user relay module 104 may comprise a means to store content, such as a storage device. In yet a further embodiment, user relay module 104 may be operative to time-shift and/or place-shift content. In yet another embodiment, user relay module 104 may comprise Digital Transmission Content Protection ("DTCP") functionality, selectable output control ("SOC") functionality, and the like.

In some embodiments, user relay module 104 may be operative to transmit content to remote viewing module 106 via an internet-based communications network 116 (shown in FIGS. 1B and 1C), such as, a wide-area-network ("WAN"), such as the internet, a local-area-network ("LAN"), a virtual private network connection ("VPN"), and the like. In some embodiments, some of the components of system 100 may be directly connected, while others may be connected through internet-based network 116, as shown in FIG. 1B. In yet other embodiments, all of the components of system 100 may be connected via internet-based network 116, or networks, as shown in FIG. 1C. In situations when any or all of the various components of system 100 are connected through network 116, the various interconnections between each of the components may be of various types of network connections. For example, some connections may be TCP/IP, FTP, or VPN based internet connections, while others may be directly linked such as through a fiber optic or satellite communications network.

User relay module 104 may communicate with content access management module 112 and remote viewing module 106, either through a direct connection, or through network connection 116, in order to receive requests to transmit content to remote viewing module 106, whether such requests originate from remote viewing module 106 directly through network 116, or from remote viewing module 106 via user relay module 104 and network 116. User relay module 104 may also receive digital rights and conditional access rights keys from content access management module 112 in order to transmit content to remote viewing module 106.

In another embodiment, content access management module 112 may be operative to communicate with primary content provider module 102, user relay module 104, remote viewing module 106, and secondary content provider module 114 via internet-based communications network 116. Secondary content provider module 114 may be operative to transmit content to remote viewing module 106 via internet-based communications network 116, and wherein secondary content provider module 114 may be operative to authorize transmission of content from user relay module 104 to remote viewing module 106 via internet-based communications network 116.

In some embodiments, content access management module 112 may comprise a conditional access ("CA") and/or digital rights management ("DRM") system, such as, but not limited to, a CA and/or DRM server. In some embodiments, content access management module 112 may be operative to receive DRM/CA related data or information from primary content provider module 102 and/or secondary content provider module 114. In some embodiments, content access management module 112 may be operative to handle requests for content from user relay module 104 and/or remote viewing module 106, determine whether the DRM/CA conditions are met, and if so, provide user relay module 104 and/or remote viewing module 106 with the appropriate DRM/CA keys required to transmit the content (in the case of the user relay module 104), or play the content (in the case of the remote viewing module 106), and if not, request authorization from secondary content provider module 114, which may require a payment of a fee, such as a roaming fee, wherein secondary content provider module 114 may provide the necessary DRM/CA keys to content access management module 112 upon authorizing the transmission of said content. Upon receiving said keys from secondary content provider module 114, content access management module 112 may transmit those keys to user relay module 104 and/or remote viewing module 106. Accordingly, content access management module 112 may communicate with primary and secondary content provider modules 102, 114 to ensure that remote viewing module 106 is authorized to receive the content, to inform primary and secondary provider modules 102, 114 that a content request has been made, where the request has been made from, and which content is requested.

The DRM/CA rights may comprise rights related to territory, such as geographical region, timing, such as distribution windows, time of day, date, and the like, venue, such as home video, theatres, and the like, distribution chain, such as which distributors have distributed the content, medium, such as digital, video on demand, cable television, satellite, and the like, and type of content, such as movies, television shows, and the like. The content may comprise any type of content, such as audio and/or video content, which may include films, television shows, sporting events, news events, musical pieces, such as songs, and the like.

The content access management module 112 may negotiate distribution rights and licenses between primary and secondary content provider modules 102, 114, should primary content provider modules 102 not have the right to distribute the content being request due to various conditions, such as territory, timing, request numbers, and the like, and to broker the exchange of CA/DRM keys. Should primary content provider module 102 not have distribution rights, content access management module 112 may request that secondary content provider module 114 transmit the content to remote viewing module 106, and content access management module 112 may manage the DRM/CA restrictions between secondary content provider module 114 and remote viewing module 106. Furthermore, content access management module 112 may negotiate access rights directly between remote viewing module 106 and secondary content provider module 114 should remote viewing module request to access content available only on secondary content provider module 114's network. For example, in some situations, a censored version of the content may be required to be transmitted to remote viewing module 106 (which may be due to local laws). Accordingly, the content may have to be provided by secondary content provider module 114.

In some embodiments, remote viewing module 106 may comprise a subscriber identification module ("SIM") card, or a unique identifier, such as, but not limited to, a media access control ("MAC") address, which may be recognized by secondary content provider module 114 and may be used as a means of authentication/authorization and for billing purposes between not only secondary content provider module 114 and remote viewing module 106, but also between secondary content provider module 114 and primary content provider module 102. In another embodiment, conditional access or digital rights management client 110 may comprise a software application. In some embodiments, conditional access or digital rights management client 110 may be operative to analyze CA/DRM data associated with content to determine whether playback or transmission of said content is authorized. Furthermore, the conditional access or digital rights management client 110 may be operative to use CA/DRM keys to authorize playback/transmission of said content. In some embodiments, user relay module 104 may comprise a conditional access and/or digital rights management client, wherein said client may be similar to client 110.

Remote viewing module 106 may be any type of remote viewing module, such as a remote content viewing device, which may include, but is not limited to, a PC, a laptop, a tablet PC, a telephone, a smartphone, a IPTV device, and the like. Remote viewing module 106 may comprise a display device, such as a screen or a projector. Remote viewing module 106 may further comprise audio/video outputs which may be connected to an external viewing device. Remote viewing module 106 may comprise Digital Transmission Content Protection ("DTCP") functionality, selectable output control ("SOC") functionality, and the like. Remote viewing module 106 may further comprise a cable owner identification number ("COIN"), which may serve to identify remote viewing module 106 as being part of primary content provider module 102's system, and which content access management module 112 may use to authenticate remote viewing module 106, and thereupon authorize user relay module 104, primary content provider module 102, and/or secondary content provider module 114 to transmit content to remote viewing module 105. The COIN may be part of CA/DRM client 110. In an alternate embodiment, the COIN may be embedded in remote viewing module 106, either as a hardware component (i.e. a SIM card), a software component (i.e. a software application), or a combination of both hardware and software components. In yet another embodiment, the COIN may be embedded in a dongle which may be connected remote viewing module 106.

Figure 2A:
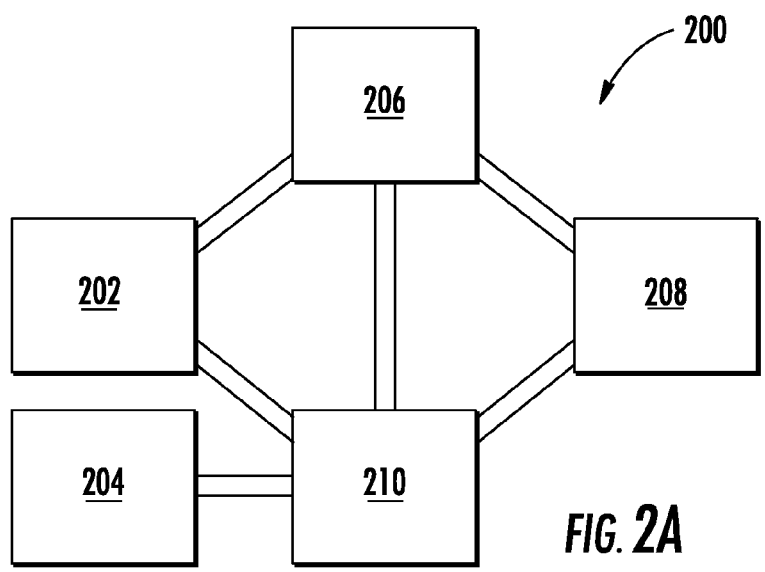
FIGS. 2A and 2B show a system in accordance with various embodiments.

Referring now to FIG. 2A, a system 200 is shown, wherein system 200 comprises a primary content provider 202, a secondary content provider 204, a streaming media device 206 connected to primary content provider 202, a remote viewing device 208 connected to streaming media device 206, and a content access management module 210 connected to primary content provider 202, secondary content provider 204, streaming media device 206, and remote viewing device 208, wherein content access management module 210 may be operative to receive a request for transmission of content from remote viewing device 208, wherein the content is to be transmitted from streaming media device 206, check whether remote viewing device 208 is authorized to receive the content from primary content provider 202 via streaming media device 206, request authorization from secondary content provider 204 if first content provider 202 is not authorized to transmit the content to remote viewing device 208 via streaming media device 206, and authorize transmission of the content from streaming media device 206 to remote viewing device 208 if transmission has been authorized by primary content provider 202 or secondary content provider 204.

Primary content provider 202 may be a domestic video content provider, such as, but not limited to, a cable television provider, a satellite television provider, a video on demand provider, a content distributor, a content producer, a content distribution network ("CDN"), a content rental provider, a streaming content provider, or a content studio. The term "domestic," as used herein, may refer to a customer's domestic, domiciliary, or home content provider. Often times, customers have a content provider that supplies content to their homes via content distribution networks, such as cable, satellite, video-on-demand, and streaming content networks. In these cases, the customers' domestic content providers would be their home content providers. Secondary content provider 204 may comprise a foreign or third party content provider, such as television content provider, a video on demand provider, a content distributor, a content distribution network, a content producer, a content studio, a content rental provider, a streaming content provider, and the like. The terms "foreign" or "third party" may refer to content provider to which a customer is not subscribed to, such as a content provider in a foreign territory.

Figure 2B:
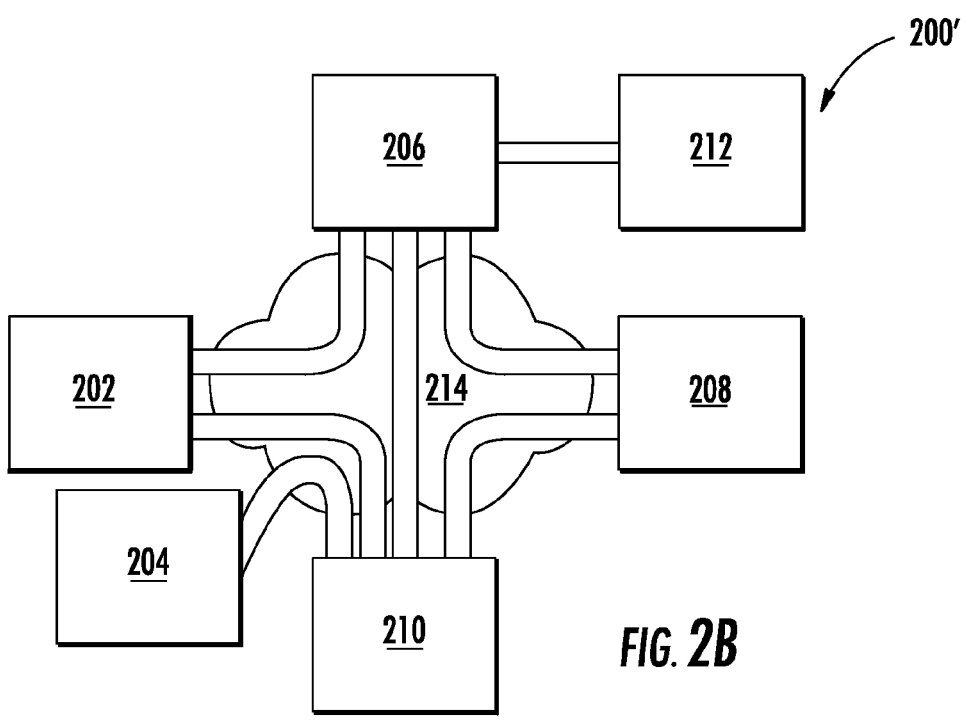

In some embodiments streaming media device 206 may be operative to receive content from primary content provider 202, decode the content if necessary, and either pass it through to a local display device 212 (as shown in FIG. 2B), or transmit it to remote viewing device 208. In some embodiments, streaming media device 206 may be operative to receive content from primary content provider 202 via an intermediary content decoding module, which may be connected to streaming media device 206, and which may be operative to receive content from primary content provider 202, decode it if necessary, and pass it on to streaming media device 206. The intermediary content decoding module may comprise a cable box, satellite television box, or internet protocol television ("IPTV") box. The streaming media device 206 may be equipped with inputs and outputs, such as RCA input/outputs, co-axial cable input/outputs, DisplayPort ("DP") input/outputs, Digital Visual Interface ("DVI") input/outputs, High Definition Multimedia Interface ("HDMI®") input/outputs, and the like. Accordingly, the streaming media device 206 may be equipped with High-bandwidth Digital Content Protection ("HDCP") or similar technology to enable it to decode, decrypt, copy, transmit, or play HDCP protected content, or content protected by similar digital rights or conditional rights access protections. In a further embodiment, streaming media device 206 may comprise a means to store content, such as a storage device. In yet a further embodiment, streaming media device 206 may be operative to time-shift and/or place-shift content. In yet another embodiment, streaming media device 206 may comprise Digital Transmission Content Protection ("DTCP") functionality, selectable output control ("SOC") functionality, and the like.

In some embodiments, streaming media device 206 may be operative to transmit content to remote viewing device 208 via an internet-based communications network 214 (shown in FIG. 2B) such as, a wide-area-network ("WAN"), such as the internet, a local-area-network ("LAN"), a virtual private network connection ("VPN"), and the like. In some embodiments, some of the components of system 200 may be directly connected, while others may be connected through internet-based network 214, as shown in FIG. 2B. In yet other embodiments, all of the components of system 200 may be connected via internet-based network 216, or networks, as shown in FIG. 2B. In situations when any or all of the various components of system 200 are connected through network 214, the various interconnections between each of the components may be of various types of network connections. For example, some connections may be TCP/IP, FTP, or VPN based internet connections, while others may be directly linked such as through a fiber optic or satellite communications network.

Streaming media device 206 may communicate with content access management module 210 and remote viewing device 208, either through a direct connection, or through network connection 214, in order to receive requests to transmit content to remote viewing device 208, whether such requests originate from remote viewing device 208, directly through network 214, or from remote viewing device 208 via streaming media device 206 and network 214. Streaming media device 206 may also receive digital rights and conditional access rights keys from content access management module 210 in order to transmit content to remote viewing device 208

In another embodiment, content access management module 210 may be operative to communicate with primary content provider 202, streaming media device 206, remote viewing device 208, and secondary content provider 204 via internet-based communications network 214. Secondary content provider 204 may be operative to transmit content to remote viewing device 208 via internet-based communications network 214, and wherein secondary content provider 204 may be operative to authorize transmission of content from streaming media device 206 to remote viewing device 208 via internet-based communications network 214.

In some embodiments, content access management module 210 may comprise a conditional access and/or digital rights management system, such as, but not limited to, a CA and/or DRM server. In some embodiments, content access management module 210 may be operative to receive DRM/CA related data or information from primary content provider 202 and/or secondary content provider 204. In some embodiments, content access management module 210 may be operative to handle requests for content from streaming media device 206 and/or remote viewing device 208, determine whether the DRM/CA conditions are met, and if so, provide streaming media device 206 and/or remote viewing device 208 with the appropriate DRM/CA keys required to transmit the content (in the case of the streaming media device 206), or play the content (in the case of the remote viewing device 208), and if not, request authorization from secondary content provider 204, which may require a payment of a fee, such as a roaming fee, wherein secondary content provider 204 may provide the necessary DRM/CA keys to content access management module 210 upon authorizing the transmission of said content. Upon receiving said keys from secondary content provider 204, content access management module 210 may transmit those keys to streaming media device 206 and/or remote viewing device 208. Accordingly, content access management module 210 may communicate with primary and secondary content providers 202, 204 to ensure that remote viewing device 208 is authorized to receive the content, to inform primary and secondary providers 202, 204 that a content request has been made, where the request has been made from, and which content is requested.

Accordingly, content access management module 210 may be operative to check whether a set of digital or conditional access rights associated with the content or remote viewing device 208 are satisfied prior to authorizing transmission of the content to remote viewing device 208. Content access management module may be operative to provide streaming media device 206 or remote viewing device 208 with a digital rights or conditional access rights key, wherein the key may be used by a digital rights or conditional access rights client residing on streaming media device 206 or remote viewing device 208, to authorize the playback or transmission of the content.

The DRM/CA rights may comprise rights related to territory, such as geographical region, timing, such as distribution windows, time of day, date, and the like, venue, such as home video, theatres, and the like, distribution chain, such as which distributors have distributed the content, medium, such as digital, video on demand, cable television, satellite, and the like, and type of content, such as movies, television shows, and the like. The content may comprise any type of content, such as audio and/or video content, which may include films, television shows, sporting events, news events, musical pieces, such as songs, and the like. The DRM/CA rights associated with the content or remote viewing device 208 may alternatively comprise the time at which the content is to be transmitted, the date on which the content is to be transmitted, the geographic location of streaming media device 206 (which may be obtained by a location determination means, such as a GPS module, connected to streaming media device 206), the geographic location of remote viewing device 208 (which may be obtained by a location determination means, such as a GPS module, connected to remote viewing device 208), the type of remote viewing device 208, the number of remote viewing devices 208 requesting the content, authorized territories (where the content is authorized to be played/transmitted), authorized distribution windows (when the content is authorized to be played/transmitted), authorized distribution channels (how the content is authorized to be transmitted), or the number of times the content has been requested (especially applicable in rental situations, or limited playback situations).

The content access management module 210 may negotiate distribution rights and licenses between primary and secondary content providers 202, 204, should primary content provider 202 not have the right to distribute the content being request due to various conditions, such as territory, timing, request numbers, and the like, and to broker the exchange of CA/DRM keys. Should primary content provider 202 not have distribution rights, content access management module 210 may request that secondary content provider 204 transmit the content to remote viewing device 208, and content access management module 210 may manage the DRM/CA restrictions between secondary content provider 204 and remote viewing device 208. Furthermore, content access management module 210 may negotiate access rights directly between remote viewing device 208 and secondary content provider 204 should remote viewing device 208 request to access content available only on secondary content provider 204's network. For example, in some situations, a censored version of the content may be required to be transmitted to remote viewing device 208 (which may be due to local laws). Accordingly, the content may have to be provided by secondary content provider 204.

In some embodiments, remote viewing device 208 may comprise a subscriber identification module ("SIM") card, or a unique identifier, such as, but not limited to, a media access control ("MAC") address, which may be recognized by secondary content provider 204 and may be used as a means of authentication/authorization and for billing purposes between not only secondary content provider 204 and remote viewing device 208, but also between secondary content provider 204 and primary content provider 202. In another embodiment, remote viewing device 208 and/or streaming media device 206 may comprise a DRM/CA rights management client, wherein the conditional access or digital rights management client may reside on remote viewing device 208 and/or streaming media device 206, and wherein DRM/CA rights management client may comprise a software application. In some embodiments, the conditional access or digital rights management client may be operative to analyze CA/DRM data associated with content to determine whether playback or transmission of said content is authorized. Furthermore, the conditional access or digital rights management client may be operative to use CA/DRM keys to authorize playback/transmission of said content.

Remote viewing device 208 may be any type of remote viewing module, such as a remote content viewing device, which may include, but is not limited to, a PC, a laptop, a tablet PC, a telephone, a smartphone, a IPTV device, and the like. Remote viewing device 208 may comprise a display device, such as a screen or a projector. Remote viewing device 208 may further comprise audio/video outputs which may be connected to an external viewing device. Remote viewing device 208 may comprise Digital Transmission Content Protection functionality, selectable output control functionality, and the like. Remote viewing device 208 may further comprise a cable owner identification number, which may serve to identify remote viewing device 208 as being part of primary content provider 202's system, and which content access management module 210 may use to authenticate remote viewing device 208, and thereupon authorize streaming media device 206, primary content provider 202, and/or secondary content provider 204 to transmit content to remote viewing device 208. The COIN may be part of the CA/DRM client. In an alternate embodiment, the COIN may be embedded in remote viewing device 208, either as a hardware component (i.e. a SIM card), a software component (i.e. a software application), or a combination of both hardware and software components. In yet another embodiment, the COIN may be embedded in a dongle which may be connected remote viewing device 208.

Figure 3:
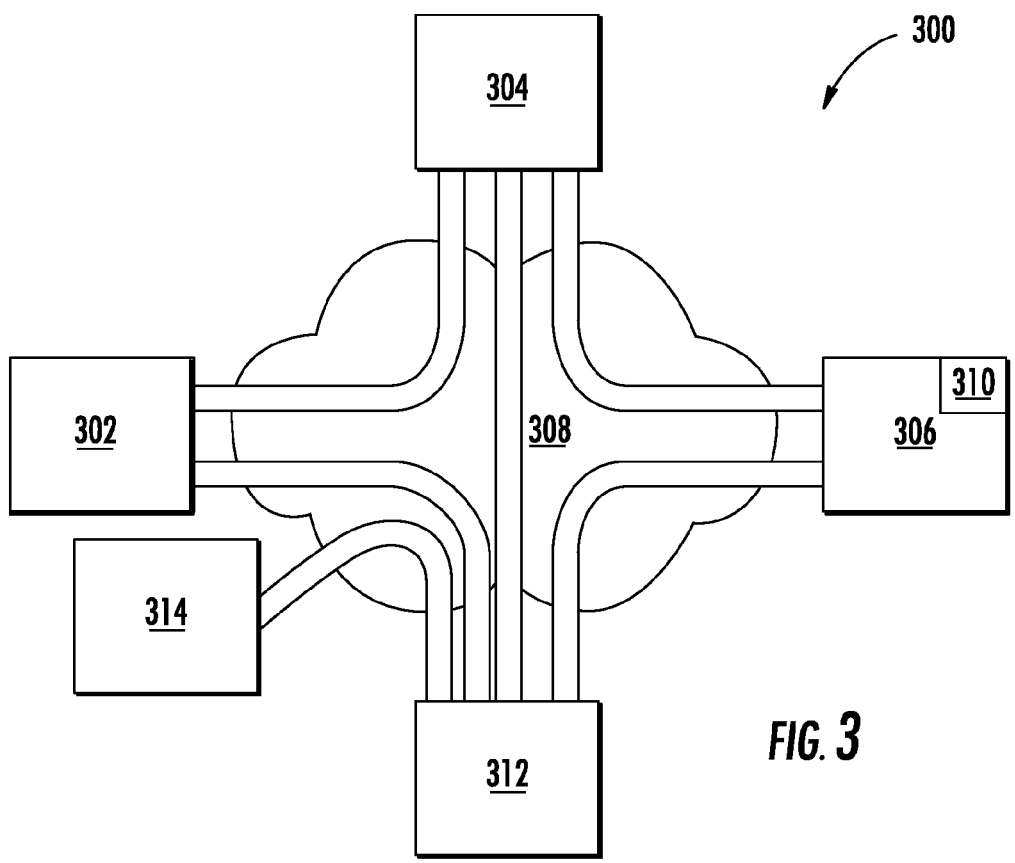
FIG. 3 shows a system in accordance with one embodiment.

Referring now to FIG. 3, a system 300 is shown in accordance with one embodiment, wherein system 300 comprises at least one primary content provider 302, at least one streaming media device 304 connected to at least one primary content provider 302, at least one remote content viewing device 306 connected to the at least one streaming media device 304 via an internet-based communications network 308, wherein at least one remote content viewing device 306 comprises a digital or conditional access rights management client 310, and may be operative to request content from the at least one streaming media device 304, or at least one digital rights and conditional access rights management server 312, wherein the at least one digital rights and conditional access rights management server 312 is connected to the at least one primary content provider 302, at least one streaming media device 304, at least one remote content viewing device 306, and at least one secondary content provider 314, wherein the at least one digital rights and conditional access rights management server 312 may be operative to receive requests for content from the at least one remote content viewing device 306, wherein the content is originating from the at least one primary content provider 302, check whether the at least one remote content viewing device 306 is authorized to receive the content from the at least one primary content provider 302 via the at least one streaming device 304, wherein checking whether the at least one remote content viewing device 306 is authorized to receive content from the at least one primary content provider 302 comprises checking whether a set of digital rights or conditional access rights associated with the content or the at least one remote content viewing device 306 are satisfied, authorize the at least one primary content provider 302 to transmit the content to the at least one remote content viewing device 306 via the at least one streaming media device 304 if the digital rights or conditional access rights associated with the content or the at least one remote content viewing device 306 are satisfied, request authorization from the at least one secondary content provider 314 if the digital rights or conditional access rights associated with the content or the at least one remote content viewing device 306 are not satisfied, authorize transmission of the content from the at least one primary content provider 302 to the at least one remote content viewing device 306 via the at least one streaming device 304 or from the at least one secondary content provider 314 to the at least one remote content viewing device 306 if the at least one secondary content provider 314 grants authorization to transmit the content, and broker a fee payment between the primary content provider 302 or the at least one remote content viewing device 306, and the at least one secondary content provider 314 if the at least one secondary content provider 314 requires a fee in exchange for granting authorization to transmit the content from the at least one primary content provider 302 via the at least one streaming media device 304 to the at least one remote content viewing device 306.

Primary content provider 302 may be a domestic video content provider, such as, but not limited to, a cable television provider, a satellite television provider, a video on demand provider, a content distributor, a content producer, a content distribution network ("CDN"), a content rental provider, a streaming content provider, or a content studio. The term "domestic," as used herein, may refer to a customer's domestic, domiciliary, or home content provider. Often times, customers have a content provider that supplies content to their homes via content distribution networks, such as cable, satellite, video-on-demand, and streaming content networks. In these cases, the customers' domestic content providers would be their home content providers. Secondary content provider 314 may comprise a foreign or third party content provider, such as television content provider, a video on demand provider, a content distributor, a content distribution network, a content producer, a content studio, a content rental provider, a streaming content provider, and the like. The terms "foreign" or "third party" may refer to content provider to which a customer is not subscribed to, such as a content provider in a foreign territory.

In some embodiments streaming media device 304 may be operative to receive content from primary content provider 302, decode the content if necessary, and either pass it through to a local display device, or transmit it to remote content viewing device 306. In some embodiments, streaming media device 304 may be operative to receive content from primary content provider 302 or secondary content provider 314 via an intermediary content decoding module, which may be connected to streaming media device 304, and which may be operative to receive content from primary content provider 302 or secondary content provider 314, decode it if necessary, and pass it on to streaming media device 306. The intermediary content decoding module may comprise a cable box, satellite television box, or internet protocol television ("IPTV") box. The streaming media device 304 may be equipped with inputs and outputs, such as RCA input/outputs, co-axial cable input/outputs, DisplayPort ("DP") input/outputs, Digital Visual Interface ("DVI") input/outputs, High Definition Multimedia Interface ("HDMI®") input/outputs, and the like. Accordingly, the streaming media device 304 may be equipped with High-bandwidth Digital Content Protection ("HDCP") or similar technology to enable it to decode, decrypt, copy, transmit, or play HDCP protected content, or content protected by similar digital rights or conditional rights access protections. In a further embodiment, streaming media device 304 may comprise a means to store content, such as a storage device. In yet a further embodiment, streaming media device 304 may be operative to time-shift and/or place-shift content. In yet another embodiment, streaming media device 304 may comprise Digital Transmission Content Protection ("DTCP") functionality, selectable output control ("SOC") functionality, and the like.

In some embodiments, streaming media device 304 may be operative to transmit content to remote content viewing device 306 via internet-based communications network 308, wherein network 308 may comprise any type of network, such as, a wide-area-network ("WAN"), such as the internet, a local-area-network ("LAN"), a virtual private network connection ("VPN"), and the like. In some embodiments, some of the components of system 300 may be directly connected, while others may be connected through internet-based network 308. In yet other embodiments, all of the components of system 300 may be connected via internet-based network 308, or networks, as shown in FIG. 3. In situations when any or all of the various components of system 300 are connected through network 308, the various interconnections between each of the components may be of various types of network connections. For example, some connections may be TCP/IP, FTP, or VPN based internet connections, while others may be directly linked such as through a fiber optic or satellite communications network.

Streaming media device 304 may communicate with digital rights and conditional access rights management server 312 and remote content viewing device 306, either through a direct connection, or through network connection 308, in order to receive requests to transmit content to remote content viewing device 306, whether such requests originate from remote content viewing device 306, directly through network 308, or from remote content viewing device 306 via streaming media device 304 and network 308. Streaming media device 304 may also receive digital rights and conditional access rights keys from digital rights and conditional access rights management server 312 in order to transmit content to remote content viewing device 306

In another embodiment, digital rights and conditional access rights management server 312 may be operative to communicate with primary content provider 302, streaming media device 304, remote content viewing device 308, and secondary content provider 314 via internet-based communications network 308. Secondary content provider 314 may be operative to transmit content to remote content viewing device 306 via internet-based communications network 308, and wherein secondary content provider 314 may be operative to authorize transmission of content from streaming media device 304 to remote content viewing device 306 via internet-based communications network 308.

In some embodiments, digital rights and conditional access rights management server 312 may comprise a conditional access and/or digital rights management system. In some embodiments, DRM and CA rights management server 312 may be operative to receive DRM/CA related data or information from primary content provider 302 and/or secondary content provider 314. In some embodiments, DRM and CA rights management server 312 may be operative to handle requests for content from streaming media device 304 and/or remote content viewing device 306, determine whether the DRM/CA conditions are met, and if so, provide streaming media device 304 and/or remote content viewing device 306 with the appropriate DRM/CA keys required to transmit the content (in the case of the streaming media device 304), or play the content (in the case of the remote content viewing device 306), and if not, request authorization from secondary content provider 314, which may require a payment of a fee, such as a roaming fee, wherein secondary content provider 314 may provide the necessary DRM/CA keys to DRM and CA rights management server 312 upon authorizing the transmission of said content. Upon receiving said keys from secondary content provider 314, DRM and CA rights management server 312 may transmit those keys to streaming media device 304 and/or remote content viewing device 306. Accordingly, DRM and CA rights management server 312 may communicate with primary and secondary content providers 302, 314 to ensure that remote content viewing device 306 is authorized to receive the content, to inform primary and secondary providers 302, 304 that a content request has been made, where the request has been made from, and which content is requested.

Accordingly, DRM and CA rights management server 312 may be operative to check whether a set of digital or conditional access rights associated with the content or remote content viewing device 306 are satisfied prior to authorizing transmission of the content to remote content viewing device 306. DRM and CA rights management server 312 may be operative to provide streaming media device 304 or remote content viewing device 306 with a digital rights or conditional access rights key, wherein the key may be used by a digital rights or conditional access rights client 310 residing on streaming media device 304 or remote content viewing device 306, to authorize the playback or transmission of the content.

The DRM/CA rights may comprise rights related to territory, such as geographical region, timing, such as distribution windows, time of day, date, and the like, venue, such as home video, theatres, and the like, distribution chain, such as which distributors have distributed the content, medium, such as digital, video on demand, cable television, satellite, and the like, and type of content, such as movies, television shows, and the like. The content may comprise any type of content, such as audio and/or video content, which may include films, television shows, sporting events, news events, musical pieces, such as songs, and the like. The DRM/CA rights associated with the content or remote content viewing device 306 may alternatively comprise the time at which the content is to be transmitted, the date on which the content is to be transmitted, the geographic location of streaming media device 304 (which may be obtained by a location determination means, such as a GPS module, connected to streaming media device 304), the geographic location of remote content viewing device 306 (which may be obtained by a location determination means, such as a GPS module, connected to remote content viewing device 306), the type of remote content viewing device 306, the number of remote content viewing devices 306 requesting the content, authorized territories (where the content is authorized to be played/transmitted), authorized distribution windows (when the content is authorized to be played/transmitted), authorized distribution channels (how the content is authorized to be transmitted), language, format of the content, contents of the content (e.g. nudity, obscenity, etc.), or the number of times the content has been requested (especially applicable in rental situations, or limited playback situations).

The DRM and CA rights management server 312 may negotiate distribution rights and licenses between primary and secondary content providers 302, 314, should primary content provider 302 not have the right to distribute the content being request due to various conditions, such as territory, timing, request numbers, and the like, and to broker the exchange of CA/DRM keys. Should primary content provider 302 not have distribution rights, DRM and CA rights management server 312 may request that secondary content provider 314 transmit the content to remote content viewing device 306, and DRM and CA rights management server 312 may manage the DRM/CA restrictions between secondary content provider 314 and remote content viewing device 306. Furthermore, DRM and CA rights management server 312 may negotiate access rights directly between remote content viewing device 306 and secondary content provider 314 should remote content viewing device 306 request to access content available only on secondary content provider 314's network. For example, in some situations, a censored version of the content may be required to be transmitted to remote content viewing device 306 (which may be due to local laws). Accordingly, the content may have to be provided by secondary content provider 314.

In some embodiments, remote content viewing device 306 may comprise a subscriber identification module ("SIM") card, or a unique identifier, such as, but not limited to, a media access control ("MAC") address, which may be recognized by secondary content provider 314 and may be used as a means of authentication/authorization and for billing purposes between not only secondary content provider 314 and remote content viewing device 306, but also between secondary content provider 314 and primary content provider 302. In another embodiment, remote content viewing device 306 and/or streaming media device 304 may comprise a DRM/CA rights management client 310, wherein the conditional access or digital rights management client 310 may reside on remote content viewing device 306 and/or streaming media device 304, and wherein DRM/CA rights management client 310 may comprise a software application. In some embodiments, the conditional access or digital rights management client 310 may be operative to analyze CA/DRM data associated with content to determine whether playback or transmission of said content is authorized. Furthermore, the conditional access or digital rights management client 310 may be operative to use CA/DRM keys to authorize playback/transmission of said content.

Remote content viewing device 306 may be any type of remote viewing module, such as a remote content viewing device, which may include, but is not limited to, a PC, a laptop, a tablet PC, a telephone, a smartphone, a IPTV device, and the like. Remote content viewing device 306 may comprise a display device, such as a screen or a projector. Remote content viewing device 306 may further comprise audio/video outputs which may be connected to an external viewing device. Remote content viewing device 306 may comprise Digital Transmission Content Protection functionality, selectable output control functionality, and the like. Remote content viewing device 306 may further comprise a cable owner identification number, which may serve to identify remote content viewing device 306 as being part of primary content provider 302's system, and which DRM and CA rights management server 312 may use to authenticate remote content viewing device 306, and thereupon authorize streaming media device 304, primary content provider 302, and/or secondary content provider 314 to transmit content to remote content viewing device 306. The COIN may be part of CA/DRM client 310. In an alternate embodiment, the COIN may be embedded in remote content viewing device 306, either as a hardware component (i.e. a SIM card), a software component (i.e. a software application), or a combination of both hardware and software components. In yet another embodiment, the COIN may be embedded in a dongle which may be connected remote content viewing device 306.

Method Embodiments

Figure 4:
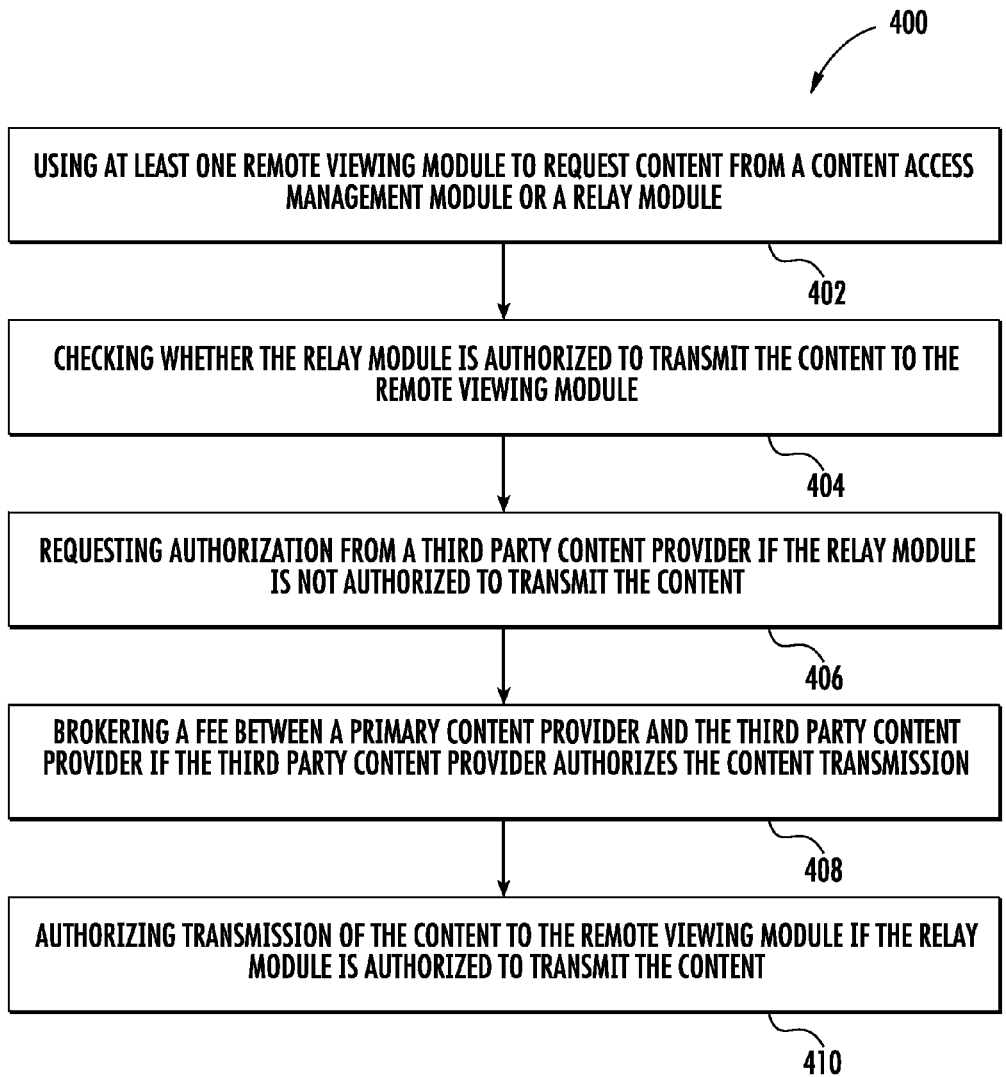
FIG. 4 shows a block diagram depicting a method in accordance with one embodiment.

Referring now to FIG. 4, a block diagram representing a method 400 is shown, wherein method 400 may comprise using at least one processor to perform any or all of the following: using at least one remote viewing module to request content from a content access management module or a relay module (block 402), checking whether the relay module is authorized to transmit the content to the remote viewing module (block 404), requesting authorization from a third party content provider if the relay module is not authorized to transmit the content (block 406), brokering a fee between a primary content provider and the third party content provider if the third party content provider authorizes the content transmission (block 408), and authorizing transmission of the content to the remote viewing module if the relay module is authorized to transmit the content (block 410).

In some embodiments, using at least one remote viewing module to request content from a relay module may comprise using at leas tone remote viewing module to request content from a relay module via a internet-based communications network. The at least one remote viewing module may comprise any of the various embodiments of remote viewing modules and devices described herein, include those described above with reference to FIGS. 1A through 5. The content may comprise any of those types of content described herein, include those described above with reference to FIGS. 1A through 5. In some embodiments, the relay module may comprise any of the various embodiments of relay modules, user relay modules, and streaming media devices described herein, including those described with reference to FIGS. 1A through 5. In yet another embodiment, the internet-based communications network may comprise any of the various embodiments of networks described herein, including those described with reference to FIGS. 1A through 5.

In one embodiment, checking whether the relay module is authorized to transmit the content to the remote viewing module may comprise checking whether the digital rights or conditional access rights conditions associated with the content are satisfied. The digital rights or conditional access rights associated with the content may be any of those embodiments of digital rights or conditional access rights described herein, including those described with reference to FIGS. 1A through FIG. 5. Checking whether the DRM or CA rights associated with the content are satisfied may comprise any of those processes of checking whether DRM or CA rights are satisfied described herein, including those described with reference to FIGS. 1A through 5. In yet another embodiment, the DRM and/or CA rights comprise territorial or geographical rights, temporal rights (rights related to time, such as temporal distribution windows), distribution rights, medium rights, platform rights (e.g. viewing platform rights or venue rights), format rights (e.g. content format rights), or content rights (e.g. related to contents of the content).

In another embodiment, authorizing transmission of the content to the remote viewing module if the relay module is authorized to transmit the content may comprise providing the relay module or the remote viewing device with a digital rights or conditional access rights key, wherein the key is needed to play the content. In one embodiment, the CA and/or DRM key may comprise any of the various embodiments described herein, including those described with reference to FIGS. 1A through 5. Providing the relay module or the remote viewing device with a DRM/CA key may comprise any of the various embodiments of processes described herein, including those described with reference to FIGS. 1A through 5.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the systems and methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 5 below.

Figure 5:
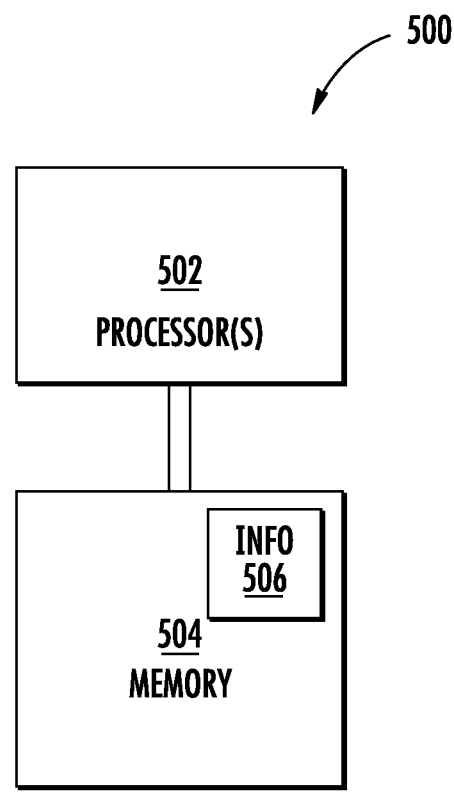
FIG. 5 shows a block diagram depicting an apparatus in accordance with one embodiment.

FIG. 5 is a block diagram representing an apparatus 500 according to various embodiments. Such embodiments may comprise a computer, a memory system, a magnetic or optical disk, some other storage device, or any type of electronic device or system. The apparatus 500 may include one or more processor(s) 504 coupled to a machine-accessible medium such as a memory 502 (e.g., a memory including electrical, optical, or electromagnetic elements). The medium may contain associated information 506 (e.g., computer program instructions, data, or both), which, when accessed, results in a machine (e.g., the processor(s) 504) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:
1. A system for content roaming comprising:
   a. a primary content provider module associated with a domestic location;
   b. a content place-shifting module configured to connect to a local display device and that is operative to receive content from the primary content provider module, and transmit the content via a wide area network to a remote viewing module, wherein the remote viewing module is located at a foreign location and comprises a conditional access or digital rights management client; and
   c. a content access management module, which is operative to:
      i. communicate with the primary content provider module, the content place-shifting module, the remote viewing module, and a secondary content provider module that is associated with the foreign location;
      ii. receive requests for transmission of the content from the primary content provider module or the secondary content provider module to the content place-shifting module or the remote viewing module, wherein the requests originate from the remote viewing module or the content place-shifting module;
      iii. broker the payment of a fee between the primary content provider module or the remote viewing module, and the secondary content provider module when the primary content provider module does not have the right to transmit the content to the remote viewing module; and
      iv. authorize transmission of the content to the remote viewing module if authorization is obtained from the primary content provider module or the secondary content provider module, wherein if the content is a censored version, authorize transmission of the cen- sored version of the content to the remote viewing module if the foreign location requires censorship.

2. The system of claim 1, wherein the domestic location comprises a domestic location associated with a user and the foreign location comprises the user's foreign location.

3. The system of claim 1, further comprising an intermediary content decoding module that interconnects the content place-shifting module and the primary content provider module.

4. The system of claim 3, wherein the intermediary content decoding module is configured to receive encoded content from the content provider module, decode the encoded content, and transmit the decoded content to the content place-shifting module for further transmission to the remote viewing module.

5. The system of claim 1, wherein the content access management module comprises a conditional access or digital rights management system.

6. The system of claim 1, wherein the remote viewing module comprises a mobile device.

7. The system of claim 1, wherein the secondary content provider module comprises a foreign or third party content provider, wherein the foreign or third party content provider comprises a cable television content provider, a satellite television provider, a video on demand provider, a content distributor, a content distribution network, a content producer, a content studio, a content rental provider, or a streaming content provider.

8. The system of claim 1, wherein the content place-shifting module is configured to pass the content through to the local display device.

9. The system of claim 3, wherein the intermediary content decoding module comprises a television set top box.

10. The system of claim 1, wherein the content access management module is operative to communicate with the primary content provider module, the content place-shifting module, the remote viewing module, and the secondary content provider module via a internet-based communications network.

11. The system of claim 1, wherein the secondary content provider module is operative to transmit content to the remote viewing module via an internet-based communications network, and wherein the secondary content provider module is operative to authorize transmission of the content from the content place-shifting module to the remote viewing module via an internet-based communications network.

12. The system of claim 1, wherein the content access management module is operative to receive digital rights management or conditional access rights information from the primary content provider module or the secondary content provider module, wherein the digital rights management or conditional access rights information comprises which distributors have distributed the content.

13. The system of claim 1, wherein the content access management module is operative to provide the content place-shifting module or the remote viewing module with a digital rights or conditional access rights key, wherein the key is used by the digital rights or conditional access client to authorize the playback of the content.

14. The system of claim 1, wherein the remote viewing module comprises an identification dongle that is configured to connect to a remote viewing device.

15. A system comprising:
   a. a primary content provider associated with a domestic location;
   b. a secondary content provider associated with a foreign location;
   c. a content place-shifting device configured to connect to a local display device and receive content from the primary content provider;
   d. a remote viewing device located at a foreign location and configured to remotely connect to the content place-shifting device; and
   e. a content access management module connected to the primary content provider, the secondary content provider, the content place-shifting device, and the remote viewing device, wherein the content access management module is operative to:
      i. receive a request for transmission of content from the remote viewing device located at the foreign location, wherein the content is to be transmitted via the content place-shifting device;
      ii. check whether the remote viewing device is authorized to receive the content from the primary content provider via the content place-shifting device;
      iii. request authorization from the secondary content provider if the primary content provider is not authorized to transmit the content to the remote viewing device via the content place-shifting device; and
      iv. authorize transmission of the content from the content place-shifting device to the remote viewing device via a wide area network if the transmission has been authorized by the primary content provider or the secondary content provider, wherein if the content is a censored version, authorize transmission of the censored version of the content to the remote viewing device if the foreign location requires censorship.

16. The system of claim 15, wherein the domestic location comprises a domestic location associated with a user and the foreign location comprises the user's foreign location.

17. The system of claim 15, wherein the remote viewing device comprises an identification dongle configured to connect to a display device located at the foreign location.

18. The system of claim 15, wherein the content access management module is operative to check whether a set of digital or conditional access rights associated with the content or the remote viewing device are satisfied prior to authorizing transmission of the content to the remote viewing device.

19. The system of claim 15, further comprising an intermediary content decoding device that interconnects the content place-shifting device and the primary content provider.

20. A system comprising:
   a. at least one primary content provider associated with a domestic location;
   b. at least one content place-shifting device configured to connect to a local display device and the-at least one primary content provider, and is further configured to receive content from the at least one primary content provider and pass the content through to the local display device;
   c. at least one remote content viewing device located at a foreign location and configured to remotely connect to the at least one content place-shifting device via an internet-based communications network, wherein the at least one remote content viewing device comprises a digital or conditional access rights management client, and is operative to request content from the at least one content place-shifting device, or at least one digital rights and conditional access rights management server; wherein
   d. the at least one digital rights and conditional access rights management server is connected to the at least one primary content provider, at least one content place-shifting device, at least one remote content viewing device, and at least one secondary content provider, wherein the at least one digital rights and conditional access rights management server is operative to:
  i. receive requests for content from the at least one remote content viewing device, wherein the content is originating from the at least one primary content provider;
  ii. check whether the at least one remote content viewing device is authorized to receive the content from the at least one primary content provider via the at least one content place-shifting device, wherein checking whether the at least one remote content viewing device is authorized to receive content from the at least one primary content provider comprises checking whether a set of digital rights or conditional access rights associated with the content or the at least one remote content viewing device are satisfied;
  iii. authorize the at least one primary content provider to transmit the content to the at least one remote content viewing device via the at least content place-shifting device if the digital rights or conditional access rights associated with the content or the at least one remote content viewing device are satisfied;
  iv. request authorization from the at least one secondary content provider if the digital rights or conditional access rights associated with the content or the at least one remote content viewing device are not satisfied;
  v. authorize transmission of the content from the at least one primary content provider to the at least one remote content viewing device via the at least one content place-shifting device or from the at least one secondary content provider to the at least one remote content viewing device if the at least one secondary content provider grants authorization to transmit the content, wherein if the content is a censored version, authorize transmission of the censored version of the content to the remote viewing device if the foreign location requires censorship; and
  vi. broker a fee payment between the primary content provider or the at least one remote content viewing device, and the at least one secondary content provider if the at least one secondary content provider requires a fee in exchange for granting authorization to transmit the content from the at least one primary content provider via the at least one content place-shifting device to the at least one remote content viewing device.

21. The system of claim 20, further comprising an intermediary content decoding device that interconnects the content place-shifting device and the primary content provider module.

22. A method comprising:
  a. using at least one processor to perform any or all of the following:
    i. using at least one remote viewing module located at a foreign location to request content from a content access management module or a content place-shifting module located with a domestic location, wherein the content place-shifting module is configured to connect to a local display device and pass the content through to the local display device;
    ii. checking whether the content place-shifting module is authorized to transmit the content to the remote viewing module, wherein if the content is a censored version, checking whether the censored version of the content must be provided in the foreign location;
    iii. requesting authorization from a third party content provider associated with the foreign location if the content place-shifting module is not authorized to transmit the content;
    iv. brokering a fee between a primary content provider and the third party content provider if the third party content provider authorizes the content transmission; and
    v. authorizing transmission of the content to the remote viewing module via a wide area network if the content place-shifting module is authorized to transmit the content.

23. The method of claim 22, wherein checking whether the content place-shifting module is authorized to transmit the content to the remote viewing module comprises checking which distributors have distributed the content.

24. The method of claim 22, wherein checking whether the content place-shifting module is authorized to transmit the content to the remote viewing module comprises checking whether the digital rights or conditional access rights conditions associated with the content are satisfied.

25. The method of claim 22, wherein authorizing transmission of the content to the remote viewing module if the content place-shifting module is authorized to transmit the content comprises providing the content place-shifting module or the remote viewing device with digital rights or conditional access rights key, wherein the key is needed to play or place shift the content.

* * * * *